United States Patent
Unde

[11] Patent Number: 6,127,643
[45] Date of Patent: Oct. 3, 2000

[54] WELDING PROCESS

[76] Inventor: Madhavji A. Unde, 1980 Watt Ave., Sacramento, Calif. 95825

[21] Appl. No.: 09/239,095

[22] Filed: Jan. 27, 1999

[51] Int. Cl.[7] ....................................................... B23K 9/18
[52] U.S. Cl. ................................ 219/73; 219/73; 228/102
[58] Field of Search ........................ 219/73, 73.2, 73.21, 219/76.11; 228/216, 103, 102

[56] References Cited

U.S. PATENT DOCUMENTS

| | | | |
|---|---|---|---|
| 3,610,868 | 10/1971 | Mantel et al. | 219/73 |
| 4,386,727 | 6/1983 | Unde | 228/102 |
| 5,024,371 | 6/1991 | Unde | 228/216 |
| 5,211,327 | 5/1993 | Clarke et al. | 219/121.13 |

*Primary Examiner*—Patrick Ryan
*Assistant Examiner*—Anjan Dey

[57] ABSTRACT

A process, called Covered Trailing Edge of Weld (CTEW) that can be applied during fusion welding that produces a weld without cracks and porosity and reduced residual stress level, is described. The process eliminates or reduces the need of non-destructive testing, re-work and post weld heat treatments in weld manufacturing. It is known that in a normal unassisted solidification of a weld, numerous cooling gradients from solid-liquid interfaces come into effect, because of numerous and multi-directions of solid crystal faces that promote crystal growth in solidifying metal in different direction. Such micro cooling gradients in molten metal are in various directions also because of varying inclinations of the surface of the cup at each point where solid base of microstructure is exposed for crystal growth. Resultant growth direction of mass of crystals/grains is determined by direction of welding, gun angle, inclination of cup surface on which crystals grow at each point and applied directions of heat conduction. Different directions of neighboring crystals thus grown at the interface, generate complex micro structure which may be dense with several entanglements or with voids which may capture gas. As the temperature falls, stress is generated at each entanglement according to property of the metals involved. In the process described a heat sink is created on the trailing edge of weld (TEW) by depositing a material on it as the welding progresses. Such deposited material absorbs heat from the solidifying metal adjoining it, beneath it, and creates a unidirectional cooling gradient that is stronger than individual micro-cooling gradients at each point at the interface. The deposited material has lower melting point than the temperature at solidification of the metal. Thus, heat conduction is reduced into the base metals, micro-cooling gradients being weaker, as part of heat in the solidifying cup of molten metal is conducted into heat sink on TEW. Thus, in CTEW process easy growth of crystals is assisted by superimposed constant heat flow towards TEW. Such a pattern of growth of crystals creates compact arrangement of crystals, eliminating porosity and voids due to gas which may otherwise be entrapped in complex micro structure during solidification, as temperature falls. The covering formed on TEW insulates the weld metal beneath it so that radiation to atmosphere is reduced and the micro structure is incubated, which provides further means to reduce the stress.

4 Claims, 4 Drawing Sheets

WELDING PROCESS

This process relates to the field of welding by using a process such as Gas Tungsten Arc, Gas Metal Arc or Submerged Arc Welding processes, in which a metal joint is formed by melting the metals.

In normal welding operations, it may become necessary to use non-destructive testing of welded components and also the post weld treatments to reduce the residual stress in weldments. Further, there may be a need of repair during welding operation which requires additional shop handling, equipment and manpower. This increases the cost of the product. Further, some such defects such as porosity can never be reduced after welding is done. Therefore there is need for a process which will eliminate such costs and disadvantages, during welding. This can be achieved by my Covered Trailing Edge of Weld (CTEW) process.

BACKGROUND OF THE INVENTION

Rosenthal in 30's found that in a welding using electric arc, the "hill of heat" moves on a weld center line and brings about melting of metals and as the molten metal solidifies weld results. He stated the hill of heat is rigid in physical dimensions and moves over center line of two stationary plates placed in juxta position for butt welding and therefore welding is a quasi stationary process.

I found that in every welding operation, "a cup of molten metal runs at the welding speed on the centerline of two plates placed in juxta position for butt welding and as the cup of molten metal runs at a welding speed, a dynamically stable state is created at the trailing edge of the weld (TEW). The resultant cup in solid metals is also rigid in physical dimensions, as long as welding parameters and thickness of plate on which it is created are constant. In the next state, the molten metal in the cup enters into solidifying state. Thus a Second Quasi Stationary State (SQS) state is created in welding operation. This SQS state has two components: the Liquid Metal Zone (LMZ) and Solidifying Metal Zone (SMZ). LMZ in the cup is under the arc; the SMZ follows the LMZ and adjoins it, in a gradual manner, during solidification process. Due to heat flux directions in the LMZ, a specific depth of penetration and shape of the cup results in the solid metals of the base plates. This function utilizes the superheat input to the weld through arc.

At the beginning of the SMZ which follows LMZ, easy and free growth of a crystal from the solid-liquid interface is obstructed by growth of numerous crystals in its vicinity having numerous directions of growths. Therefore, a complex micro structure results in unassisted weld solidification process. The numerous directions of growths of crystals is due to numerous cooling gradients that come into effect instantly because of numerous directions of exposed micro structures on the solid-liquid interface, in the solidifying metal. The curved surface demarcated in solid metal, seen in cross section of a solidified weld, when cross section is made at right angles to the direction of welding, also assists in bringing about complexity in the directional growth of micro structure. With obstructions from numerous crystals growing around a crystal or grain, the resultant micro structure becomes dense with several entanglements of crystals or with voids which may capture gas as temperature falls.

As the heat is dissipated, the crystal/grain structure contracts and results in stress generation at individual entanglements depending upon the property of metals involved. Therefore total stress we call residual stress is generated in a weld. This is the primary stress that causes secondary reaction stresses to come into effect in welded base plates. Thus, we see distortion in the welded component.

This can be compared to a simple but compact structure due to mass of crystals and grains that can grow in a resultant one direction, by my process described below.

If we consider total heat quantity input to a weld as A, it normally contents three parts, B, C and D. Part B is superheat responsible for bringing about the penetration and the specific shape of cup in the solid base metals. And C is the quantity of heat that is dissipated in the base metals. D is the heat radiation into atmosphere in a welding operation. Quantity D is neglected as it is usually constant. Solid sites of micro structure in the surface of the cup are exposed to the molten metal. A polycrystalline solid material such as steel, has micro structure with faces exposed in several directions at the interface. These form sites for crystals to grow in solidifying metal in the SMZ. There is excess heat quantity C in the volume of cup at solidification temperature after formation of the cup in solid base metals. This excess heat is conducted in various directions in base metals. Because a crystal must grow naturally in the direction opposite to cooling gradient established, a overall complex crystal structure is established in the solidifying molten metal. In the process developed, some part of quantity C of the heat is conducted into the material deposited on the TEW. In the experiment described to illustrate the CTEW process, the heat extraction melts the material deposited on TEW because of the deposited material has melting point lower than the temperature of the solidified surface at TEW and the semi-solid weld metal beneath it. Thus, heat quantity "c" is extracted in TEW on which heat sink is created in preference to its dissipation into base metals. Thus, CTEW process controls heat dissipation into base metals and develops cooling gradients in the SMZ. This promotes overall unidirectional growth of mass of crystals in the SMZ. Such unidirectional growth of crystals drives out gas molecules. Thus porosity is eliminated. Since entanglements of crystals are reduced. Thus, the stress generated at such entanglements as the mass of crystals solidifies is also reduced. Thus, incidence of micro-cracks is also reduced.

The CTEW process is different from the Sub Merged Arc Process (SAW) as in SAW process, it is the arc which is submerged with different objectives. In the CTEW process it is the TEW that is covered, objective being to modify the micro structure.

In unassisted welding solidification process, stresses generated at micro structure level, are known to be characterized with short span and high values. Such stresses can be relieved only by post weld heat treatment in absence of application of processes of this inventor covered under U.S. Pat. Nos. 4,386,727 and 5,024,371 or application of the present CTEW process. During incubation period in a post weld heat treatment, such as post heat treatment in a furnace, such stress is known to be relieved. One mechanism known is micro plasticity. Neither the incubation time necessary nor the precise temperature at which such a post weld treatment operation should be carried out is ever determined. Further it is obvious that such post weld heat treatments may reduce the stresses in distorted part but may or may not relieve the primary stress entirely in the weld that caused distortion. In fact relaxation of primary stress that caused distortion is alone necessary. Further such post weld heat treatments may not be applicable to parts with large size, as facilities of heat treatment can be cost prohibitive. Such postweld treatments may not remove porosity.

SUMMARY OF INVENTION

It is therefore the principal object of my invention to develop a process that can be applied during a fusion welding operation such as Gas Metal Arc Welding or Gas Tungsten Arc Welding, to eliminate or to reduce incidence of internal cracks, porosity and residual stress in a weld. Since primary (residual) stresses are reduced in a weld, objective accomplishes also the reduction of distortion in the weldment, as secondary reaction stresses are reduced.

Another object is to develop a process which will reduce the need and costs of non destructive testing (NDT), such as Dye Penetrant Testing, Ultrasonic or radiography methods, after welding.

A still further object of my invention is to develop a process which will reduce or eliminate need of rework, cost of handling and time in welding manufacturing operations.

A still further object of my invention is to develop a process which will reduce or eliminate need of post-weld heat treatments and disadvantages, equipment and costs associated with it.

More particularly, heat input to a weld, after achieving the desired penetration and shape of the cup, dissipates in base metals or is conducted in fixtures or back-up and also by radiation. In this CTEW process, the same is partially extracted from the TEW by dissipation by melting the material, deposited on the TEW, as illustrated in the experiment that is described below.

The deposited material formed a coating on TEW after melting and its solidification. This formed a barrier for heat radiation into atmosphere in this CTEW process. Thus, the experiment illustrates a process in which incubation of microstructure also may take place.

Further such a coating can be formed by melting a coat of suitable material applied to base plates placed in juxta position prior to welding, forming slag covering on weld surface after melting due to welding heat input.

Further the coating formed provides incubation of micro structure beneath it and time for incubation can be increased by addition of a second coat of insulating material over the first coat on the TEW, if necessary.

Further objects and salient features of the invention will be apparent from the following detailed description of the specific experiment and claims when considered with annexed drawings which include several preferred embodiments of the present invention.

BRIEF DESCRIPTION OF DRAWINGS

FIG. 3a and FIG. 3aa show the design of the I-beam. FIG. 3b shows experimental curves obtained during SAW welding of the I-beams.

FIG. 4 is another example of application of CTEW process for a GMAW weld.

DETAILED DESCRIPTION OF THE PREFERRED EMBODIMENTS

Figure 1:
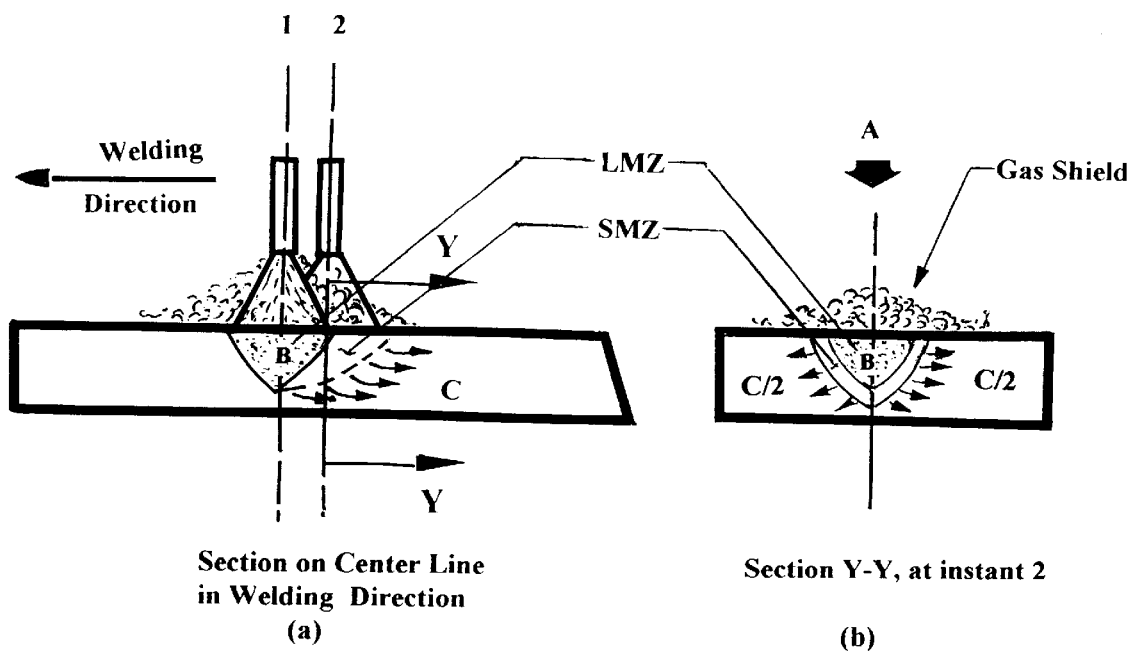
FIG. 1 is the schematic diagram of Trailing Edge of Weld. The figure shows conditions when the arc has moved from instant 2 to instant 1, due to welding speed.

In FIG. 1 direction of welding is shown by an arrow close to welding gun at instant 1. In the figure, section (a) is shown taken on weld center line along welding direction; and (b) is a section on Y—Y at instant 2, perpendicular to welding direction. Two successive instants 1 and 2 are shown as the arc moves ahead due to welding speed. Instant 1 occurs when the heat input is made by the arc. The total quantity input is "A". Because of superheat, melting takes place and cup is formed in the solid base plates. The specific shape and penetration of the cup in the solid metal is due to heat flux directions in the molten metal created by the arc. Because heat input is constant and weld parameters remain unchanged, the shape and the penetration of the cup remains constant. After superheat is used, the heat quantity "B" is held in the molten metal in the cup. This quantity of heat is conducted in base metals shown as "C" and partly it is radiated into atmosphere, as temperature falls.

As the cup of molten metal moves to instant 1, the arc partly uncovers the cup. Liquid Metal Zone(LMZ) is always under the arc. And solidifying metal zone (SMZ) comes into effect at the trailing edge of the cup of LMZ. Quantity of heat "C" is conducted into base plates as shown in section (a), resulting quantity of heat, C/2, conducted in each of two base plates, neglecting radiation losses, shown in section (b). Since total heat quantity "C" is dissipated into various heat paths generated by solid micro structure at the interface, and heat dissipates into the direction provided by various cooling gradients in the base metals, the numerous crystals grow in numerous directions in the SMZ from the interface. The SMZ is in the SQS state at each instant. This process creates complex micro structure in SMZ as free and easy growth of crystals is obstructed. As the temperature of the SMZ falls due to conduction of heat, the stress is generated at various entanglements of micro structures. This stress depends upon specific property of the metal/alloy that defines falling temperature versus strength. Figure also shows the inert gas shield provided in the GMAW process.

Figure 2:
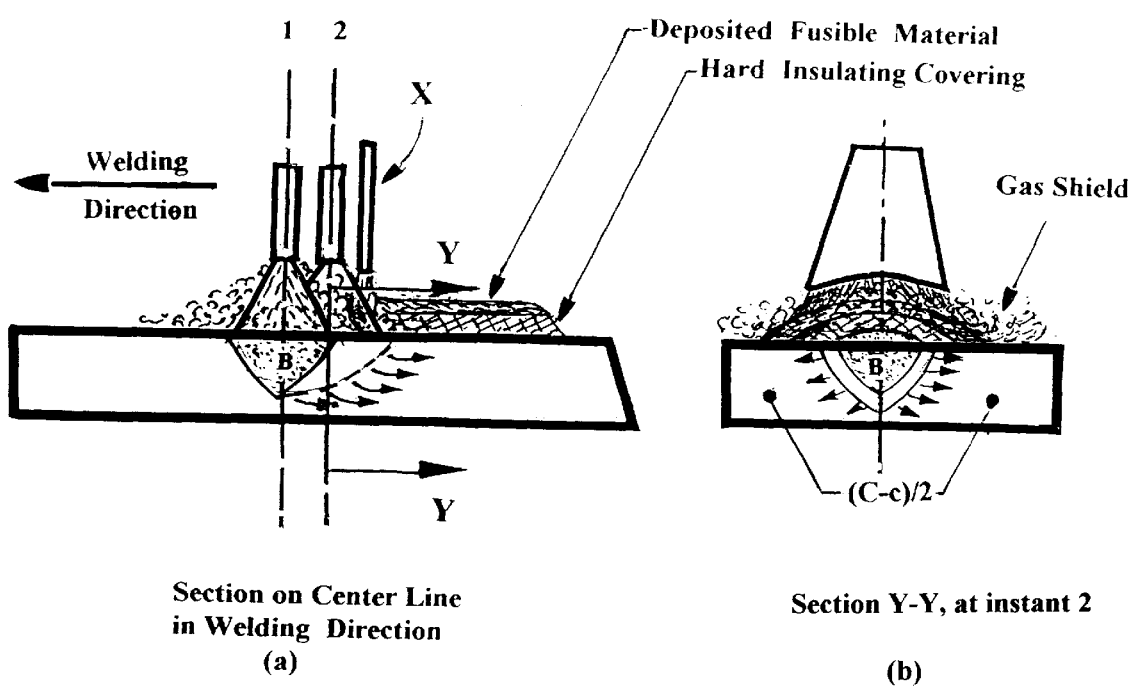
FIG. 2 is a schematic, as in FIG. 1, showing cross sections (a) and (b). It shows effective flow of heat quantity "c" into the deposited fusible material. Gun "x" deposits the fusible material on TEW.

FIG. 2 shows the fusible material that is deposited by gun "X" on the TEW. Heat quantity "c" is absorbed into the deposited material that melts and conducts heat quantity "c" towards TEW and forms a hard coating on the TEW. This covering has property of insulation that provides for incubation of the micro structure beneath it, until the said material is removed by means such as air blast or vacuum or by brush cleaning. Heat quantity "c" is a fraction of the heat quantity "C", the heat dissipated to base metals in FIG. 1. Thus, total heat entering base plates is (C-c) in FIG. 2, (c—c)/2 being the heat quantity entering into each base plate, shown in section (b). Thus heat flow into base plates can be reduced by covering provided by fused material on TEW that forms insulation also, against radiation heat loss into atmosphere. Heat flows faster into deposited fusible material as it has lower melting point than the solidifying weld metal beneath it. FIG. 2 also shows the inert gas cover in the GMAW process.

Figure 3:
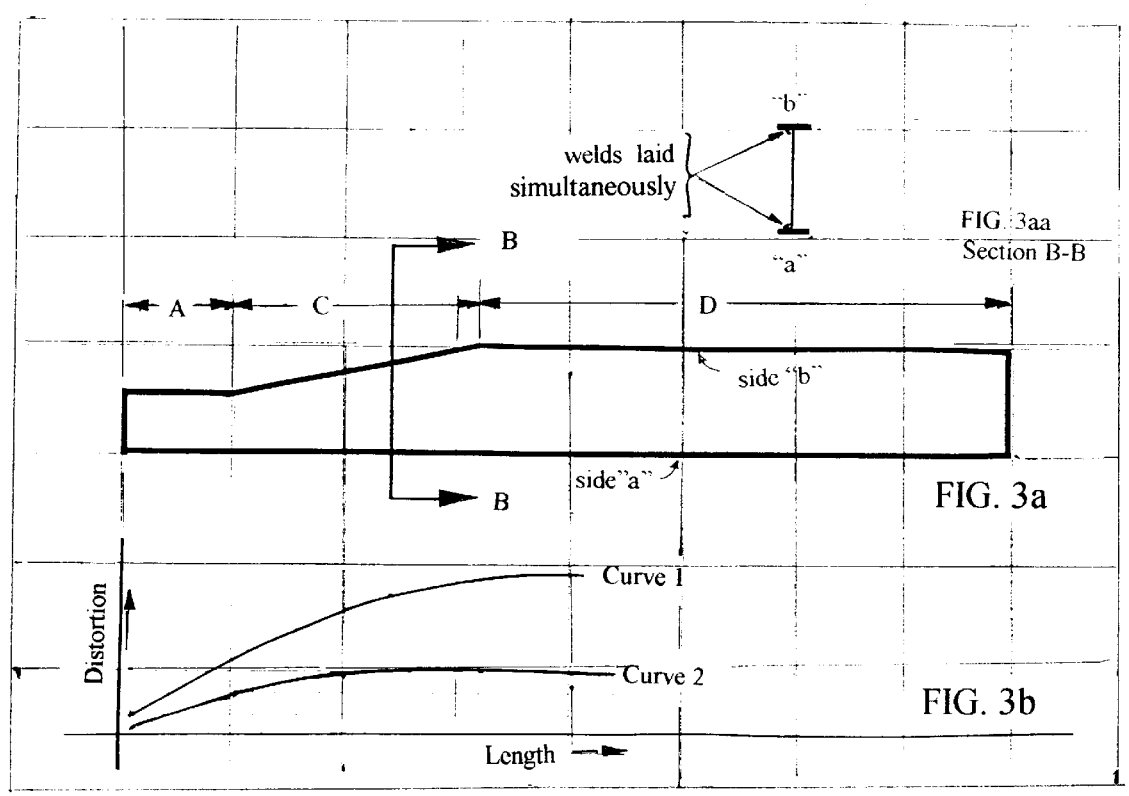
FIG. 3 is a schematic showing effect of application of CTEW process to manufacture of I-beams.

Comparison of FIGS. 1 and 2, show that heat conduction into base metals from the interface, can be reduced in the CTEW process. A stronger unidirectional constant path of heat conduction can be established towards TEW. Thus the overall crystal growth is oriented in one direction, as other factors, namely, gun angle and direction of welding as well as the curved shape of the cup of the interface between molten metal and solid metal remain constant FIG. 3 is an example of application of CTEW process in weld manufacture of I-beams in automatic welding machine. Web and hat sections are fed in flat position, hat sections are held mechanically vertical, the said hat section and the web remaining in contact. Thus rollers carry the said web and hat sections in the automatic I-beam welding machine at the welding speed and two SAW welds are laid on sides "a" and "b" by SAW welding guns, as shown in section B—B, in FIG. 3aa. Two ½ inch thick hat sections are welded to 5/16 inch thick web section. The design of the beam is shown in FIG. 3a and FIG. 3aa and it shows sections "C" and "A" of the beam with reduced width. Since width of the web gradually reduces over section "C", and thicker hat section as well as the welding parameters remain constant during automatic welding operation, the differential residual stresses are developed gradually in the reducing web section.

Welding was carried out by SAW process at 28.5 Volts, at 78 inches per minute welding speed, stick out 1⅛ inch, Current flow designed for side "a" and side "b" remained constant in all experimental beams. The flux pick-up was at 14 inches on both sides in control samples. This caused distortion. The measured values gave results shown by Curve 1 in FIG. 3b. When the flux pick-up was set at 5 feet on side "b", the distortion measured resulted in Curve 2. Curve 2 shows the effect of CTEW process in the manufacture of these I-beams, Curve 1 and Curve 2 correspond to solidification processes explained by FIG. 1 and FIG. 2. Experimental 6 beams were tested for repeatability of results. AU1 beams thereafter were produced with reduced distortion confirming to Curve 2.

Figure 4A:
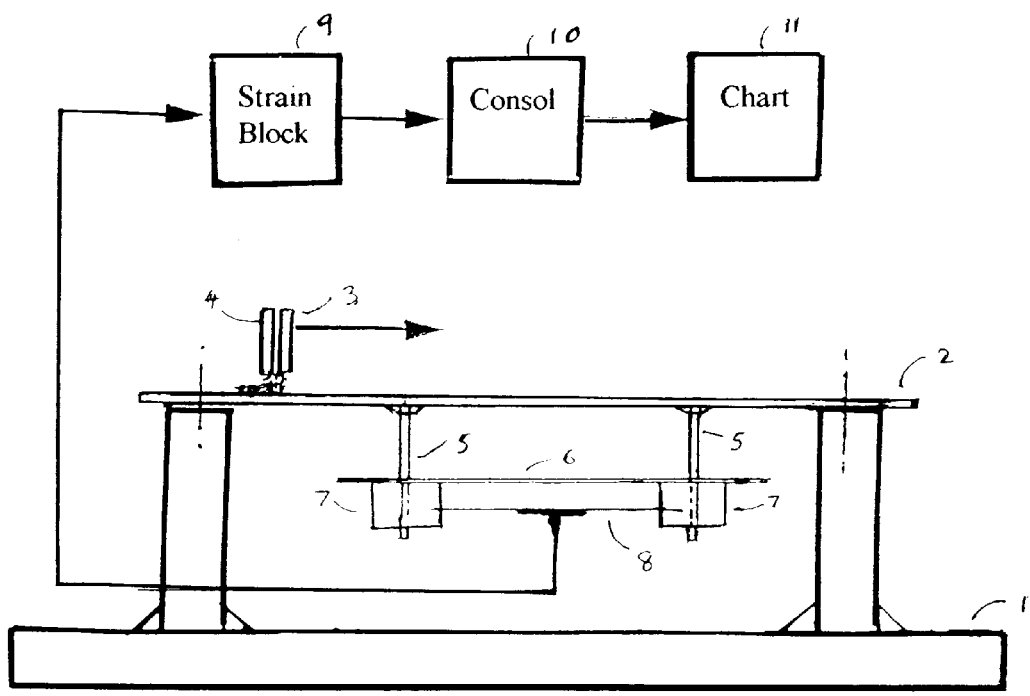
FIG. 4a is a schematic showing set-up for experimental GMAW welds for butt welding of two plates in which residual stress is measured.
Figure 4B:
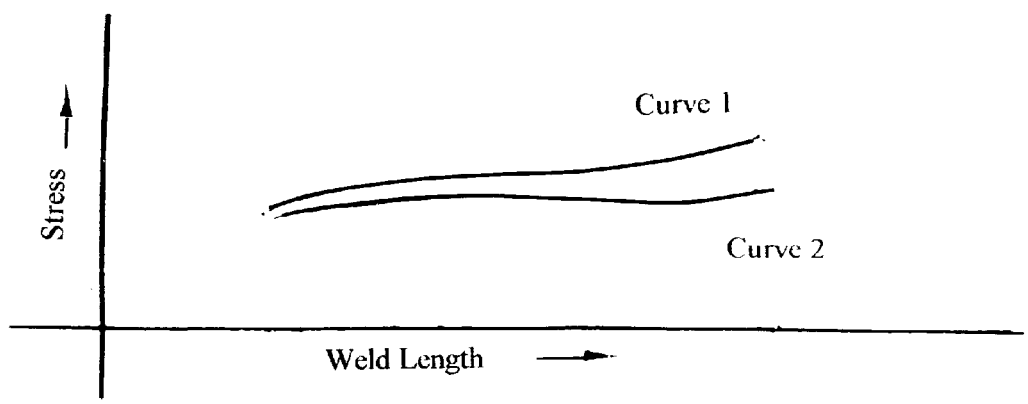
FIG. 4b shows curves plotted showing distortion due to residual stress along the length of the welds, Curve 1 welding with unassisted solidification, Curve 2, welding with CTEW process, in which cooling gradients are applied to TEW.

FIG. 4 shows another example of application of CTEW process for GMAW process. FIG. 4(a) shows Strain Gage Bridge (SGB), 8, designed by this inventor in which a strain gage is pasted on a thin steel strip. The SGB is mounted on stud-welded studs 5. Shown in the figure, 1 is the welding fixture which carries plates 2, supported on columns welded to base of the fixture. Welding is carried out by MIG gun 3 in the direction shown. 4 is a gun that deposits the fusible material on TEW. 9 is the dummy strain block and change in resistance of the strain gage is measured by Whetstone Bridge console 10. 11 is the chart recorder.

In these experiments welding was carried on Aluminum alloy 5083, ½ inch thick, by GMAW process using ER 5356 filler, at 20 Volts, 120 amps DCRP, at 2 inches per minute, with argon 40 cfh. And residual stress as measured using CTEW process was plotted and is shown by Curve 2 in FIG. 4(b). The same figure also shows Curve 1, the residual stress in the weld in which CTEW process was not used.

An additional layer of insulating material can obviously be put on the fused covering laid by gun 4, to conserve the heat in the solidified TEW from radiation. This layer will provide additional incubation time for micro structure beneath the covering. During incubation period the micro structure is known to relieve residual stress by the process of plastic deformation, in general. Precise nature of all such mechanisms are still unknown It is to be understood that while detailed drawings and specific examples given describe the preferred embodiments of my invention, they are for illustration only. In butt welding, illustrated in FIGS. 1 and 2, there are two gross heat flow paths provided by each of two base plates. In I-beam illustration, there are three such gross heat flow paths and number of gross heat flow paths may increase depending upon the cross sections of metal/s available for heat conduction from the cup of molten metal. And the process invented is not limited to precise details and conditions and various changes can be made within ambit and scope of my invention. It is to be understood that the experiments described are for proving the process invented; and in practical applications, deposition of the low melting fusible material, or applying a coat of liquid metal before welding as mentioned or even flow of liquid which evaporates and thus, causes a heat sink on TEW that extracts portion of heat input to the weld, is alone essential. Forming slag covering on the TEW and addition of second layer of insulation is of importance, when used. But other details such as welding process itself, or filler metals or absence of filler metals or specification of back-up or fixture are unimportant.

My invention is defined by the following claims:

1. A method for extracting heat from the trailing edge of a weld, the said trailing edge of weld having an interface between the solidified surface and solidifying cup of molten metal beneath it, comprising steps of (a) depositing a fusible or evaporating material on the said trailing edge of weld;

(b) the said deposited material having melting or evaporating point lower than the solidification temperature of the said solid surface at the said trailing edge of the weld;

(c) the said deposited material melting or evaporating on the trailing edge, the said solidified trailing edge forming interface covering on the solidifying metal beneath it, the said solidifying metal being at temperature higher than the solidified surface over it, (d) the said deposited material extracting heat from the said solidifying metal through the said solidified metal surface at the said trailing edge.

(e) providing width of the deposited material equal to the width of the said weld.

(f) the said covering incubating the solidified micro structure beneath the said solidified surface.

2. A process as claimed in claim 1, in which a liquid material may be deposited, the said liquid metal evaporating at a temperature lower than the temperature of the said solidified surface of the trailing edge of the said weld, the liquid material evaporating and extracting heat from the solidifying metal beneath the solidified layer of the said trailing edge of the said weld.

3. A process according to claim 1, in which a material may be applied to weld base plates prior to welding on centerline of base plates placed in juxta position for welding, the said material melting due to heat input to the weld, forming covering on the weld trailing edge; the said covering providing increased incubation period for the microstructure beneath the trailing edge.

4. A process according to claim 1, in which a layer of suitable insulating material may be deposited on the said trailing edge, the said material increasing the incubation period for the solidified microstructure beneath it.

* * * * *